United States Patent [19]

Torii et al.

[11] Patent Number: 5,132,887
[45] Date of Patent: Jul. 21, 1992

[54] MULTI-ARTICULATION TYPE ROBOT FOR LASER OPERATION

[75] Inventors: Nobutoshi Torii, Hachioji; Susumu Ito, Yamanashi; Akihiro Terada, Yamanashi; Yasuo Sasaki, Yamanashi, all of Japan

[73] Assignee: Fanuc Limited, Yamanashi, Japan

[21] Appl. No.: 499,339

[22] PCT Filed: Oct. 17, 1989

[86] PCT No.: PCT/JP89/01065
§ 371 Date: Jun. 15, 1990
§ 102(e) Date: Jun. 15, 1990

[87] PCT Pub. No.: WO90/04487
PCT Pub. Date: Mar. 5, 1990

[30] Foreign Application Priority Data
Oct. 17, 1988 [JP] Japan ................. 63-259414

[51] Int. Cl.$^5$ ................... H01S 3/00; B23K 26/00
[52] U.S. Cl. ....................... 362/259; 362/423; 362/424; 219/121.78; 901/42
[58] Field of Search .......... 362/259, 419, 423, 424; 901/15, 42; 219/121.78, 121.79

[56] References Cited

U.S. PATENT DOCUMENTS

| | | | |
|---|---|---|---|
| 3,888,362 | 6/1975 | Fletcher et al. | 901/15 |
| 4,545,713 | 10/1985 | Beni et al. | 901/15 |
| 4,563,567 | 1/1986 | Geffroy et al. | 901/15 |
| 4,578,554 | 3/1986 | Coulter | 219/121.78 |
| 4,623,229 | 11/1986 | Galan | 362/259 |
| 4,698,483 | 10/1987 | Marinoni et al. | 219/121.67 |
| 4,707,596 | 11/1987 | Hohberg | 219/121.78 |
| 4,831,232 | 5/1989 | Andersson et al. | 901/42 |

FOREIGN PATENT DOCUMENTS

62-130788 6/1987 Japan.
62-199284 12/1987 Japan.

Primary Examiner—Ira S. Lazarus
Assistant Examiner—Y. Quach
Attorney, Agent, or Firm—Armstrong, Nikaido, Marmelstein, Kubovcik & Murray

[57] ABSTRACT

A multi-articulation type robot for a laser operation by emitting a beam of laser into a desired position in a three-dimensional space, and provided with a first hollow robot arm (16) swingably pivoted to an upper end of a robot swivel body (14) mounted on a robot base (12), a second hollow robot arm (18) swingably pivoted to a front end of the first robot arm (16) and rotatable about a central axis of the second robot arm per se, and a robot wrist (20) mounted on a front end of the second robot arm (18) and provided with a laser beam collecting unit (22) having a laser beam emitting outlet (22a), the robot wrist (20) being provided with motion transmitting mechanisms for converting first and second rotative inputs transmitted by a first and second hollow rotatable drive shafts (30a and 30b) arranged inside the second robot arm (18) into motions by which the laser beam collecting unit (22) is rotated about an axis orthogonal to an axis along which a laser beam is emitted, and to move the unit (22) forward and back along the axis of the laser emission.

5 Claims, 2 Drawing Sheets

MULTI-ARTICULATION TYPE ROBOT FOR LASER OPERATION

TECHNICAL FIELD

The present invention relates to a multi-articulation type robot for a laser operation in a three-dimensional space, used for an industrial purpose such as welding, cutting, and deburring made by emitting a laser beam, and more particularly, to an improved construction of a robot wrist of a multi-articulation type robot for a laser operation and provided with a unit for collecting and emitting a laser beam.

BACKGROUND ART

Various laser manipulators and robots conducting laser operations, such as welding, cutting of a workpiece, and deburring of cast and molded products by the use of a laser beam, through manipulated and robotic motions of the robots, are conventionally well known. The conventional manipulator for a laser operation is a gantry type laser machine provided with a gantry-shape machine framework, and a laser emitting unit supported by the gantry type machine framework to be moved along two orthogonal axes in a plane and along an axis perpendicular to the plane, and is effectively used for laser emitted operations such as a welding of a flat shape workpiece.

The conventional laser robot is a cartesian coordinate robot provided with a robot mechanism to move a laser unit for collecting a laser beam introduced from a laser source through an appropriate laser beam conduit, in two orthogonal axis directions and another axis direction vertical to the two orthogonal axis directions, to thereby conduct a laser operation such as a welding on a surface of a workpiece. The former and latter laser manipulator and laser robot are able to advantageously conduct an accurate laser operation on a flat workpiece by a detection of a position on the surface of the workpiece by a distance sensor, but it is difficult or impossible for both the manipulator and the robot to bring a front end of the laser collecting and emitting unit toward a corner or corners of a complicated three-dimensional article. Furthermore, in the case of the laser manipulator, the laser operation must be conducted on a workpiece mounted on a worktable disposed inside the robust gantry-shape framework, and therefore, it is difficult to install the laser manipulator in the production line of a factory, and thus the laser manipulator has a disadvantage in that it must be installed and used at a position away from the production line.

On the other hand, in the case of the laser robot, specifically a multi-articulation laser robot, the laser collecting and emitting unit attached to an end of the robot, i.e., a robot wrist, is able to access corners of a complicated three-dimensional article or product to thereby conduct a desired laser operation by the laser emission, due to the maneuverability of the robot about respective articulations, and therefore, is able to overcome the above-mentioned disadvantage of the gantry type laser manipulator.

Nevertheless, the multi-articulation type laser robot has a motion mechnism such that an end effector of the robot, to which the laser collecting and emitting unit is attached, must be brought to a target position by total changes in the position and attitude of respective movable elements of the robot, which changes are caused by rotating the respective movable elements about a plurality of articulations thereof. Therefore, when the laser operations are conducted in a continuous manner, as the laser emitting end of the laser collecting and emitting unit must be kept at a constant distance from the surface of a workpiece, it is very difficult for the robot to accurately position the end effector and the laser collecting and emitting unit each time at each position adjacent to each desired position on the surface of a workpiece, to thereby apply a laser beam to the desired position, because during the moving of the movable elements of the robot, small delays in the motions about respective articualtions are gradually accumulated to cause an error in the abovementioned positioning of the laser collecting and emitting unit. Accordingly, even if the known precise light sensitive type distance detector is employed to accurately detect a distance between the laser emitting end of the laser collecting and emitting unit and the surface of the workpiece, the robot per se cannot move rapidly enough to permit the laser emitting unit to emit a laser beam in accordance with the detected data of the light sensitive type distance detector, and accordingly, it is impossible to expect an accurate laser operation by the laser robot. Further, when a compensation for an error between an actual distance between the laser emitting unit and the desired position on the surface of the workpiece and the detected data of the light sensitive type distance detector is conducted, the respective movable elements of the robot must quickly start a compensating motion thereof about respective articulations to achieve a real time compensation. Each of the movable elements of the robot, i.e., a swivel body, and each robot arm, however, has such a large moment of inertia that the motion of the element cannot be quickly started, and therefore, the speed of starting of the motion of the each element cannot be faster than a given limited speed, and thus the robot cannot carry out a complete compensating motion due to a delay in the start of the motion of the robot. Consequently, the conventional multi-articulation type laser robot cannot be used for an accurate laser operation, for example, a cutting of a semiconductor wafer.

DISCLOSURE OF THE INVENTION

Accordingly, an object of the present invention is to provide a multi-articulation type robot for a laser operation, and having a construction capable of overcoming the above-mentioned defects encountered by the conventional multi-articulation type robot for a laser operation.

Another object of the present invention is to provide an improved construction of a robot wrist provided with a laser collecting and emitting unit.

In accordance with the present invention, there is provided a multi-articulation type robot for a laser operation, which comprises:

a hollow robot base;

a hollow robot swivel body having a lower end thereof articulated to the robot base to be capable of turning about an axis, and extending toward an upper end thereof;

a first hollow robot arm having a rear end thereof articulated to the upper end of the swivel robot body to be capable of swinging about an axis orthogonal to the axis of turning of the swivel body, and extending toward a front end thereof;

a second hollow robot arm having a part thereof articulated to the front end of the first robot arm to be capable of swinging about another axis parallel to the swinging aixs of the first robot arm, extending toward a front end thereof, and being capable of rotating about an axis orthogonal to the other swinging axis;

a laser-beam-transmitting conduit unit extending through the robot base, the robot swivel body, the first robot arm, and the second robot arm;

a laser beam collecting unit arranged at position adjacent to the front end of the second robot arm, and provided with a laser beam emitting outlet through which a laser beam is emitted in a predetermined direction;

a robot wrist holding the laser beam collecting unit thereon, and provided with an optical mechanism to direct the laser beam transmitted by the laser-beam-transmitting conduit unit toward the laser beam collecting unit;

first and second hollow drive shafts coaxially and rotatably arranged in the second hollow robot arm;

a drive source means for rotatively driving the two hollow drive shafts; and a motion transmitting unit provided inside the robot wrist to obtain a rotative motion of the robot wrist about an axis orthogonal to the rotating axis of the second robot arm and a linear motion of the robot wrist in an axial direction which is the same as the direction of emission of the laser beam from the rotations of the first and second hollow drive shafts, whereby a laser beam is emitted from the laser beam emitting outlet of the laser beam collecting unit toward a desired position in a three-dimensional space.

BRIEF DESCRIPTION OF THE DRAWINGS

The above and other objects, features, and advantages of the present invention will be made more apparent from the ensuing description of the embodiment taken in conjunction with the accompanying drawings wherein.

BEST MODE OF CARRYING OUT THE INVENTION

Figure 2:
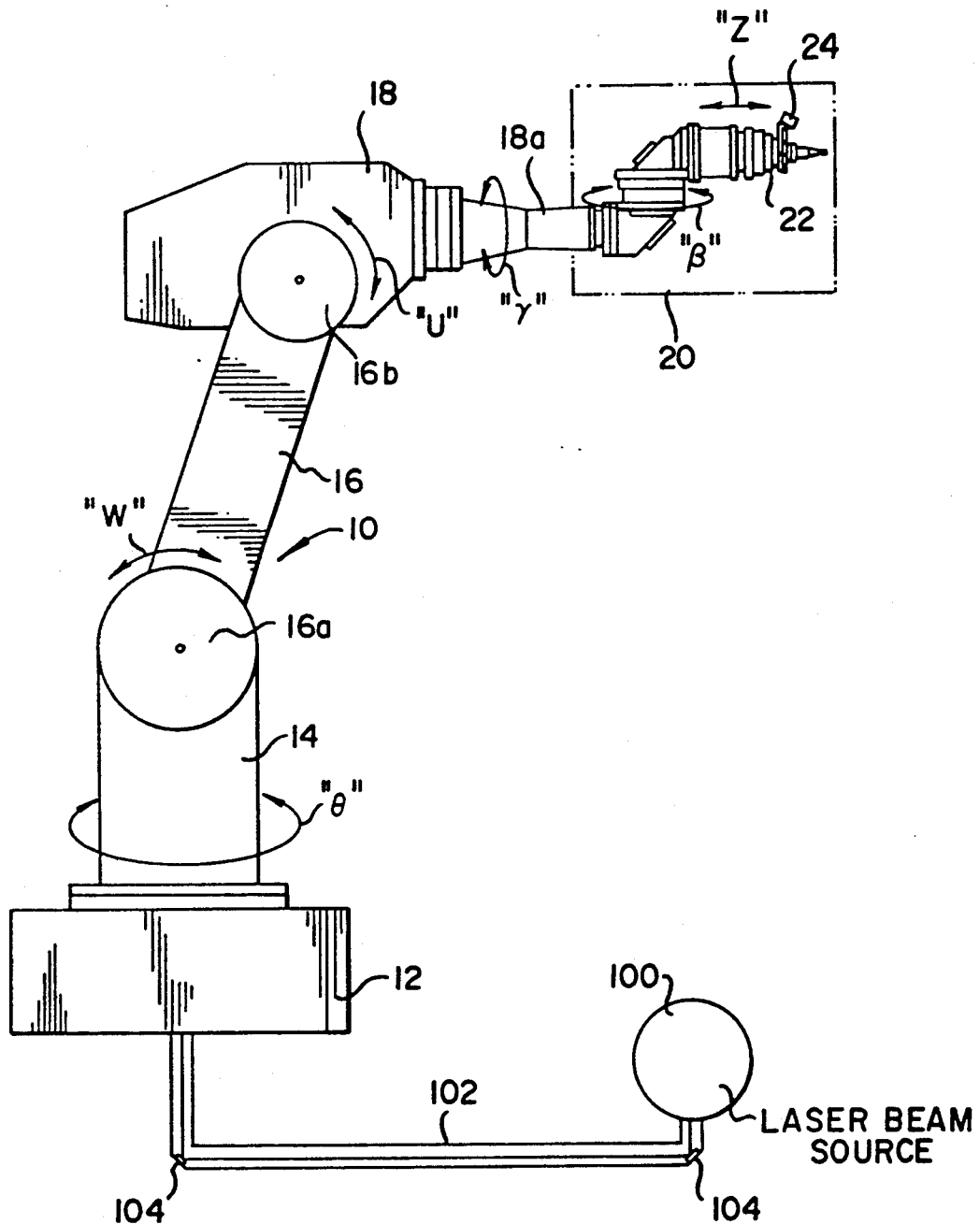
FIG. 2 is a side view of a multi-articulation type robot for a laser operation of FIG. 1, illustrating an entire construction of the robot and a relationship among the articulations of the robot.

Referring first to FIG. 2, a typical construction of a multi-articulation type laser robot is shown, wherein a robot 10 is provided with: a robot base 12 having an internally hollow construction, and installed on a floor surface at a site of use; a robot swivel body 14 mounted on the robot base 12 to be rotatable about a vertical axis ($\theta$-axis); a first robot arm 16 having an internal hollow construction thereof, and provided with a position 16a of a rear end thereof, at which the arm 16 is articulated to an upper end of the robot swivel body 14 to be swingable about a horizontal axis (W-axis); a second robot arm 18 having an internal hollow construction thereof, and provided with a portion 16b at which the arm 18 is articulated to be swingable about another horizontal axis (U-axis) parallel with the above-mentioned W-axis, and a front arm portion 18a rotatable about a longitudinal axis of the robot ($\gamma$-axis); and a robot wrist 20 connected to the front end of the front arm portion 18a of the second arm 18. The robot wrist 20 is provided with a later-described laser beam transmitting conduit therein, and a laser beam collecting unit 22 at the front end thereof. Although not shown, rotative motions of the movable elements about the above-mentioned respective axes ($\theta$axis through $\tau$axis) are derived from respective drive motors, i.e., the servo-motors, and the arrangement of the servo-motors on the robot 10 is similar to the known arrangement of a conventional multi-articulation type robot.

The multi-articulation type robot according to the present embodiment is constructed to serve as a robot for conducting a laser operation, and therefore, a laser beam generated by a laser beam source 100 is transmitted by an appropriate laser-transmitting-conduit 102 accommodating therein reflecting mirrors, to be introduced into the body of the robot 10 via the robot base 12. The introduced laser beam is then further transmitted through laser transmitting conduit formed in the hollow swivel body 14, and the hollow first and second robot arms 16 and 18.

As apparent from the illustration of FIG. 2, the robot wrist 20 of the multi-articulation type robot 10 for a laser operation, according to the embodiment of the present invention is rotatable about an axis ($\beta$axis) orthogonal to a laser beam emitting direction Ls in which the laser beam is outwardly emitted from the laser beam collecting unit 22, and is able to linearly move the unit 22 back and forward as described in detail later. Therefore, the laser beam collecting unit 22 can be linearly moved along an axis (referred to as the Z-axis hereinafter) corresponding to the laser emitting direction. The laser beam collecting unti 22 is provided with a known distance sensor 24 of the type wherein a light is emitted and received to detect a distance, for measuring an accurate distance from a laser beam emitting outlet of the unit to a target position of a workpiece to be subjected to a laser operation.

Figure 1:
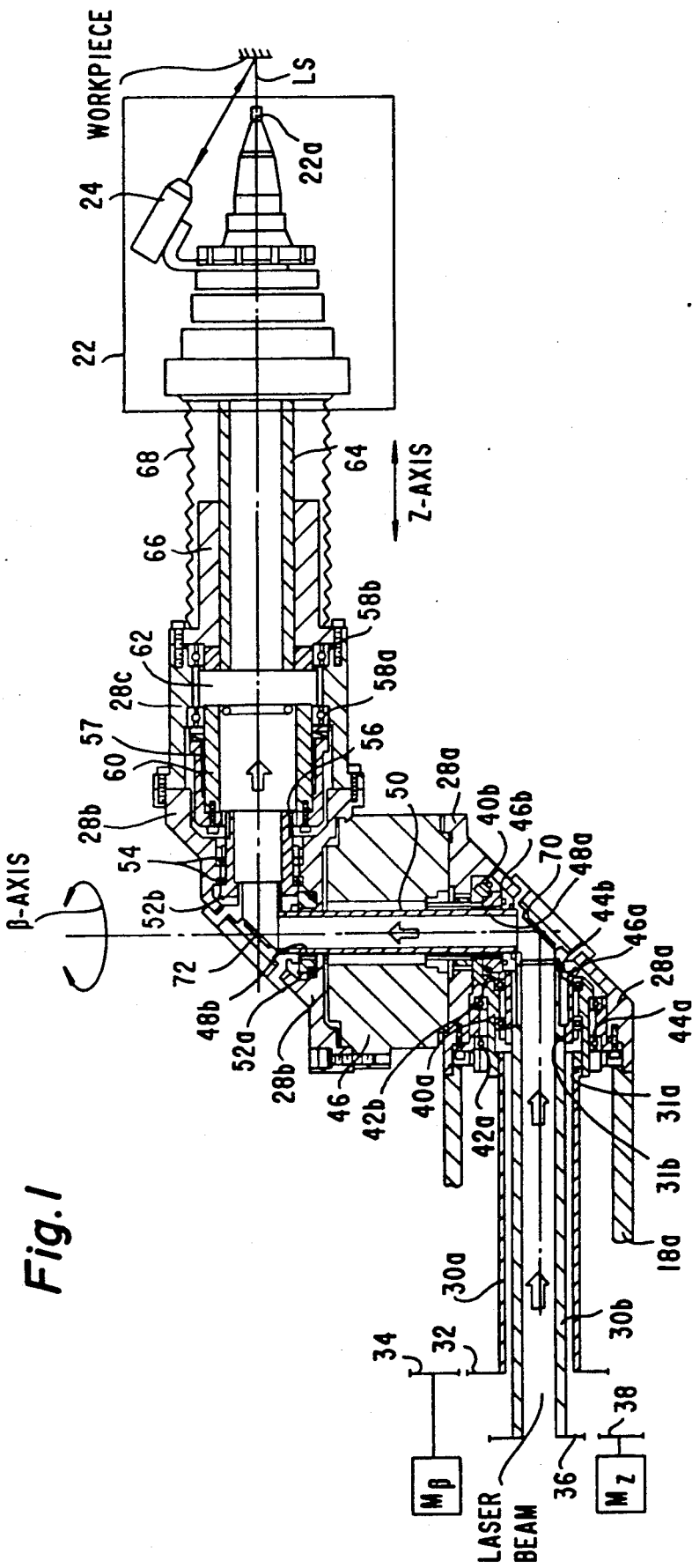
FIG. 1 is a cross-sectional view of the construction of a robot wrist of a multi-articulation type robot for a laser operation according to an embodiment of the present invention.

Referring next to FIG. 1, which illustrates a detailed construction of the robot wrist 20 connected to the front end of the above-mentioned hollow second robot arm 18, a first wrist casing 28a is fixedly connected to the front end of the front arm portion 18a of the second robot arm 18 by an appropriate connecting means, such as screws. The inside of the second robot arm 18 is formed as a hollow construction, and therefore, two hollow rotative shafts 30a and 30b are coaxially accommodated inside the second robot arm 18. The outer first hollow shaft 30a is rotatively driven by a drive motor M$\beta$ through an engagement of a gear 32 mounted on a rear end of the shaft 30a and a small gear (pinion gear) 34, to function as a drive shaft for causing a rotation of the robot wrist 20 about the $\beta$-axis.

The inner hollow second shaft 30b, has a laser beam transmitting conduit formed therein, and is rotatively driven by a drive motor Mz through an engagement of a gear 36 mounted on a rear end of the shaft 30b and a small gear (a pinion gear) 38, to thereby function as a drive shaft capable of causing a forward and a backward movement of the later-described laser collecting unit 22.

The outer first hollow drive shaft 30a has a front end engaged with a bevel gear 40a via a splined portion 31a, to be rotatable with the bevel gear 40a which per se is mounted on an inlet end portion of the first wrist casing 28a. Namely, the first hollow drive shaft 30a rotatively drives the bevel gear 40a. The bevel gear 40a is rotated by the support of a pair of rotary bearings 42a and 42b, and a pair of rotary bearings 44a and 44b, and the rotation of the bevel gear 40a is transmitted to another bevel gear 40b enagaged with said bevel gear 40a to cause a change in a direction of rotation by 90 degrees occurs. As a result, the rotation of the bevel gear 40b is in turn transmitted, via a coaxial reduction gear 46, such as a known RV reduction gear (trade name of Teijin Seiki Co., Ltd. in Japan), to the first and second wrist casings 28a, 28b, and diverse elements accommodated in the two casings 28a and 28b, whereby these first and second wrist casing and the accommodated elements are rotated about the $\beta$-axis coaxial with a central axis of the bevel gear 40b and the reduction gear 46. Namely, the robot wrist 20 is rotated about the $\beta$-axis. The second robot wrist casing 28b is threadedly connected to a cylindrical third robot wrist casing 28c having a front end to which the laser beam collecting unit 22 is connected via a rotation-to-linear motion converting mechanism to cause a forward and backward linear motion of the unit 22, and accordingly, the above-mentioned rotation of the robot wrist 20 about the $\beta$-axis is accompanied by a rotation of the laser beam collecting unit 22 connected to the frontmost end of the robot wrist 20 about the $\beta$-axis.

The inner second hollow drive shaft 30b is connected at its front end, to a bevel gear 46a via a splined connecting portion 31b, and therefore, when the second hollow drive shaft 30b is rotated, the shaft 30b rotatively drives the bevel gear 46a, to thereby rotate a bevel gear 46b engaged with the bevel gear 46a. The rotation of the bevel gear 46b is transmitted, via a splined connecting portion 48a, to a hollow shaft 50 centrally extending inside the reduction gear 46 and having a laser beam-transmitting-conduit formed therein. Accordingly, the hollow shaft 50 is rotated, to thereby cause a rotation of a bevel gear 52a via a splined connecting portion 48b provided for an upper end portion of the hollow shaft 50, and thus the rotation of the bevel gear 52a is transmitted to another bevel gear 52b while changing a direction of direction by 90 degees. The latter bevel gear 52b is rotated in the robot wrist casing 28c by the support of a pair of rotaty bearings 54, and the rotation of the bevel gear 52b is transmitted, via two splined connecting portions 56 and 57, to a rotating cylindrical member 60 rotatably supported in the robot wrist 28c by a pair of rotary bearings 58a and 58b. The rotating cylindrical member 60 is provided with a nut member 62 of a known ball-screw and nut mechanism at a front end thereof, and the nut member 62 is engaged with a ball-screw shaft 64 formed as an output member of the robot wrist 20, and accordingly, when the nut member 62 is rotated in a clockwise direction or a counter clockwise direction, the ball-screw shaft 64 is linealy moved forward and back under the guide of a ball-spline nut member 66. Namely, the ball-screw and nut mechanism comprising the nut member 62 and the ball-screw shaft 64 functions as a rotation-to-linear motion converting mechanism, to thereby linearly move the laser beam collection unit 22 connected to the front end of the ball-screw shaft 64 in an axial direction corresponding to the direction Ls of the laser beam emission. Namely, an adjustable linear movement of the laser beam collecting unit 22 in a forward and a backward direction is obtained. Reference numeral 68 designates a covering for protecting the ball-screw shaft 64 from dust and other foreign materials, and therefore, the covering 68 may be, e.g., a bellows and the like. Alternately, a suitable protecting housing may be used for receiving the ballscrew shaft 64 therein.

As described above, the robot wrist 20 according to one embodiment of the present invention is connected to the second robot arm 18 and is rotatively and linearly driven by the two drive motors $M\beta$ and Mz to thereby rotate the laser beam collecting unit 22 in a three-dimensional space, as well as linearly moving the laser beam emitting outlet of the unit 22 forward and back until the laser beam emitting outlet is positioned at an adjusted position to conduct a desired laser operation. Note: the above-mentioned drive motors $M\beta$ and Mz are controlled by a conventional robot controller via respective servo-mechanisms.

In addition to the above-mentioned drive mechanism of the robot wrist 20, laser beam transmitting conduits are accommodated in the robot wrist 20. Namely, a laser beam transmitted through the inner hollow shaft 30b of the second robot arm 18 reaches a reflecting mirror 70 fixedly arranged at an end of the first wrist casing 28a of the robot wrist 20, and is in turn reflected by the mirror 70 to change a direction of transmission by 90 degrees. Accordingly, the laser beam is further transmitted through an approximate center of the hollow shaft 50 until it reaches another reflecting mirror 72 fixedly held by the second wrist casing 28b, and is again reflected to change a direction of transmission thereof by 90 degrees. Then, the laser beam is further transmitted through a laser beam conduit formed in the inside of the above-described hollow bevel gear 52b, the hollow rotary cylindrical member 60, and the ball-screw shaft 64, and eventually reaches the laser beam collecting unit 22 which accommodates therein an optical beam collecting assembly (not shown) comprising optical lenses. Therefore, the laser beam is formed into a thin concentrated laser beam to raise an optical energy of the laser beam to a level suitable for conducting laser operations, such as welding, cutting and deburring, and is emitted from the laser beam emitting outlet 22a toward a workpiece. Note: reference numeral 24 designates a known distance sensor for accurately measuring a position of the workpiece onto which the emitted laser beam is projected. It should be understood that, as described previously, the laser beam is transmitted from the outer laser beam source 100 into the body of the robot, and then into the inner hollow shaft 30b of the second robot arm 18.

With the robot wrist 20 of the multi-articulation type robot for a laser operation according to the embodiment of the present invention, the laser beam collecting unit 22 arranged at the frontmost end of the robot wrist is able to be linearly moved forward and backward independently from the wrist. Therefore, when the laser beam collecting unit is brought by the motion of the robot movable elements to a position suitable for applying a laser beam from the laser beam outlet of the unit onto a desired position of a workpiece, the distance sensor 24 measures an accurate distance between an end 22a of the laser beam emitting outlet and the position of the workpiece onto which the laser beam is to be projected, to thereby permit the laser beam collecting and emitting unit to be adjustably and independently moved to the position suitable for applying the laser beam in response to the distance information measured by the distance sensor 24. Accordingly, compared with the conventional multi-articulation type laser robot whereby a laser beam collecting unit must be brought to and adjusted at a position suitable for applying a laser beam onto a target position of a workpiece, only by the combination of the rotations of the movable elements about the respective articulations, an adjustment of a position of the laser beam collecting unit in the three dimensional space by the multi-articulation type robot for a laser operation, with respect to a workpiece can be easily and highly accurately achieved.

Further, during a final position adjusting operation of the robot, only the latter laser beam collecting unit is moved in a linear direction against the robot wrist casings 28a through 28c to adjust a position of the laser beam emitting outlet with respect to a workpiece, and accordingly, the inertial mass of only the laser beam collecting unit 22 does not adversely affect the position adjusting operation of the robot of the present invention. Namely, according to the robot wrist of the multi-articulation type robot of the present invention, a starting speed of the final position adjusting stage of the robot can be very quick and is not adversely affected by a large moment of inertia of each robot movable element, such as each of the first and second robot arms. Therefore, in response to a measuring of data of the distance sensor, the position of the laser beam collecting unit with respect to a workpiece can be quickly adjusted without delay. Consequently, the accuracy of the laser operation by the robot wrist according to the present invention is high.

The foregoing description is concerned with one embodiment of the present invention, but it should be noted that the technical concept of the present invention is equally applicable to various types of multi-articulation type robots for a laser operation.

From the foregoing description of the present invention, it will be understood that, according to the present invention, a multi-articulation type robot used as a laser operation robot can conduct a laser operation with respect to not only a flat shape workpiece but also a workpiece having a comlicated three-dimensional shape with corners into which the laser beam must be applied. More specifically, a concentrated beam of laser is accurately applied to a desired position of a workpiece, whereby various laser operations, such as welding, cutting and deburring can be accomplished with a high accuracy. It should be further understood that, according to the present invention, sinccee an accurate measuring of data by a distance sensor with respect to a distance between the laser emitting outlet of the laser beam collecting unit and a workpiece is immediately used for adjusting a position of the laser beam emitting outlet, the laser robot of the present invention can be utilized in a precision industry demanding a highly accurate laser operation.

Finally, it should be appreciated that many modification and variations will occur to a person skilled in the art without departing from the scope and spirit of the present invention.

We claim:

1. A multi-articulation type robot for a laser operation comprising:
   a hollow robot base;
   a hollow robot swivel body having a lower end thereof articulated to the robot base to be capable of turning about an axis, and extending toward an upper end thereof;
   a first hollow robot arm having a rear end thereof articulated to the upper end of said robot swivel body to be capable of swinging about an axis orthogonal to the axis of turning of said swivel body, and extending toward a front end thereof;
   a second hollow robot arm having a part thereof articulated to the front end of said first robot arm to be capable of swinging about another axis parallel to the swinging axis of said first robot arm, extending toward a front end thereof, and being capable of rotating about an axis orthogonal to the other swinging axis;
   a laser-beam-transmitting conduit means extending through said robot base, said robot swivel body, said first robot arm, and said second robot arm;
   a laser beam collecting unit arranged at a position adjacent to the front end of said second robot arm, and provided with a laser beam emitting outlet through which a laser beam is emitted in a predetermined direction;
   a robot wrist holding said laser beam collecting unit thereon, said robot wrist comprising wrist casing means, and a hollow wrist output shaft held by said wrist casing means, said wrist casing means having said laser beam collecting unit mounted thereon, and said robot wrist also being provided with an optical means directing the laser beam transmitted by said laser-beam-transmitting conduit means toward said laser beam collecting unit;
   first and second hollow drive shafts coaxially and rotatably arranged in said second hollow robot arm;
   a drive source means for rotatively driving said two hollow drive shafts; and
   a motion transmitting means provided inside said robot wrist to obtain a rotative motion of said robot wrist about an axis orthogonal to the rotating axis of said second robot arm and a linear motion of said robot wrist in a same axial direction as the direction of emission of the laser beam from the rotations of said first and second hollow drive shafts,
   wherein said motion transmitting means comprises:
   a) a first motion transmitting assembly provided with a first bevel gear mechanism connected to said first hollow drive shaft of said second robot arm, and a reduction gear means connected to said first bevel gear mechanism for obtaining a rotation of said wrist casing means at a slower speed than that of said rotation of said robot wrist; and
   b) a second motion transmitting assembly provided with a second bevel gear mechanism connected to said second hollow drive shaft of said second robot arm, a third bevel gear mechanism connected to said second bevel gear mechanism via a rotary shaft, and a ball-screw and nut mechanism for converting a rotating output of said third bevel gear mechanism to a linear movement of said hollow output shaft of said robot wrist, and
   wherein said first hollow drive shaft of said second robot arm is arranged to function as a drive shaft for said robot wrist, said first hollow drive shaft being disposed outside said second hollow drive shaft functioning as a drive shaft for causing a linear movement of said robot wrist, an inside of said second hollow drive shaft being formed as said laser beam transmitting conduit means, and whereby a laser beam is emitted from said laser beam emitting outlet of said laser beam collecting unit toward a desired position in a three-dimensional space.

2. A multi-articulation type robot for a laser operation according to claim 1, wherein said second motion transmitting assembly further comprises a ball-spline mechanism for guiding said hollow output shaft of said robot wrist.

3. A multi-articulation type robot for a laser operation according to claim 1, wherein said optical means of said robot wrist comprises:
   a first reflecting mirror for changing a direction of transmission of the laser beam transmitted through said laser beam transmitting conduit means of said second robot arm;
   a second reflecting mirror for changing a direction of transmission of the laser beam reflected from said first reflecting mirror;
   a laser beam transmitting conduit arranged between said first and second reflecting mirrors; and
   an additional laser beam transmitting conduit means for directing said laser beam reflected by said second reflecting mirror to said laser beam collecting unit.

4. A multi-articulation type robot for a laser operation according to claim 3, wherein said first and second reflecting mirrors are fixedly held by said wrist casing means of said robot wrist.

5. A multi-articulation type robot for a laser operation according to claim 1, wherein said laser beam collecting unit further comprises a distance measuring means for measuring a distance between said laser beam emitting outlet of said laser beam collecting unit and a desired position in said three-dimensional space.

* * * * *